US012619759B2

(12) United States Patent
Niu et al.

(10) Patent No.: US 12,619,759 B2
(45) Date of Patent: May 5, 2026

(54) DATA ACCESS METHOD AND DEVICE, STORAGE MEDIUM, AND ELECTRONIC DEVICE

(71) Applicant: ZTE Corporation, Shenzhen (CN)

(72) Inventors: Jiahao Niu, Shenzhen (CN); Qiang Zhang, Shenzhen (CN); Dezheng Wang, Shenzhen (CN); Yaofeng Tu, Shenzhen (CN); Shaolin Liu, Shenzhen (CN); Yonghua Chen, Shenzhen (CN)

(73) Assignee: ZTE CORPORATION, Shenzhen (CN)

( * ) Notice: Subject to any disclaimer, the term of this patent is extended or adjusted under 35 U.S.C. 154(b) by 547 days.

(21) Appl. No.: 18/016,557

(22) PCT Filed: Jul. 16, 2021

(86) PCT No.: PCT/CN2021/106762
§ 371 (c)(1),
(2) Date: Jan. 17, 2023

(87) PCT Pub. No.: WO2022/012669
PCT Pub. Date: Jan. 20, 2022

(65) Prior Publication Data
US 2023/0289464 A1 Sep. 14, 2023

(30) Foreign Application Priority Data
Jul. 16, 2020 (CN) .......................... 202010688666.6

(51) Int. Cl.
*G06F 21/62* (2013.01)
*G06F 21/60* (2013.01)

(52) U.S. Cl.
CPC ........ *G06F 21/6227* (2013.01); *G06F 21/602* (2013.01); *G06F 21/604* (2013.01)

(58) Field of Classification Search
CPC ... G06F 21/6227; G06F 21/602; G06F 21/604
See application file for complete search history.

(56) References Cited

U.S. PATENT DOCUMENTS

2004/0054637 A1 3/2004 Negoro
2006/0248083 A1 11/2006 Sack et al.
(Continued)

FOREIGN PATENT DOCUMENTS

CN 106228084 A 12/2016
CN 10640783 A 2/2017
(Continued)

OTHER PUBLICATIONS

European Search Report for corresponding application EP21842693: Report dated Dec. 12, 2023.
(Continued)

*Primary Examiner* — Ayoub Alata
(74) *Attorney, Agent, or Firm* — CANTOR COLBURN LLP

(57) ABSTRACT

Provided are a data access method and device, a storage medium and an electronic device. The method includes: a first access request used for requesting access to data in a database is received; the first access request is parsed to obtain the following data corresponding to the first access request: a first access parameter, a first request type, and a first controlled field list; a first data protection operation is performed on the first controlled field list based on the first access parameter and the first request type to obtain a target result; and a second access request is synthesized based on the target result, and the data in the database is accessed based on the second access request, so as to obtain an access result.

16 Claims, 7 Drawing Sheets

(56)          References Cited

U.S. PATENT DOCUMENTS

| | | | |
|---|---|---|---|
| 2012/0011134 | A1 | 1/2012 | Travnik et al. |
| 2019/0347260 | A1 | 11/2019 | Li |

FOREIGN PATENT DOCUMENTS

| | | |
|---|---|---|
| CN | 107885876 A | 4/2018 |
| CN | 108959967 A | 12/2018 |
| CN | 110443059 A | 11/2019 |
| CN | 111177788 A | 5/2020 |
| JP | 2016206918 A | 12/2016 |
| JP | 2018128602 A | 8/2018 |

OTHER PUBLICATIONS

International Search Report for corresponding application PCT/CN2021/106762 filed Jul. 16, 2021; Mail date Oct. 14, 2021.
Japanese Office Action; Application No. 2023-502749; Filing Date: May 16, 2020; Date of mailing: May 27, 2020; 10 pages.

Input and output device 108

Transmission device106

Processor 102

Memory 104

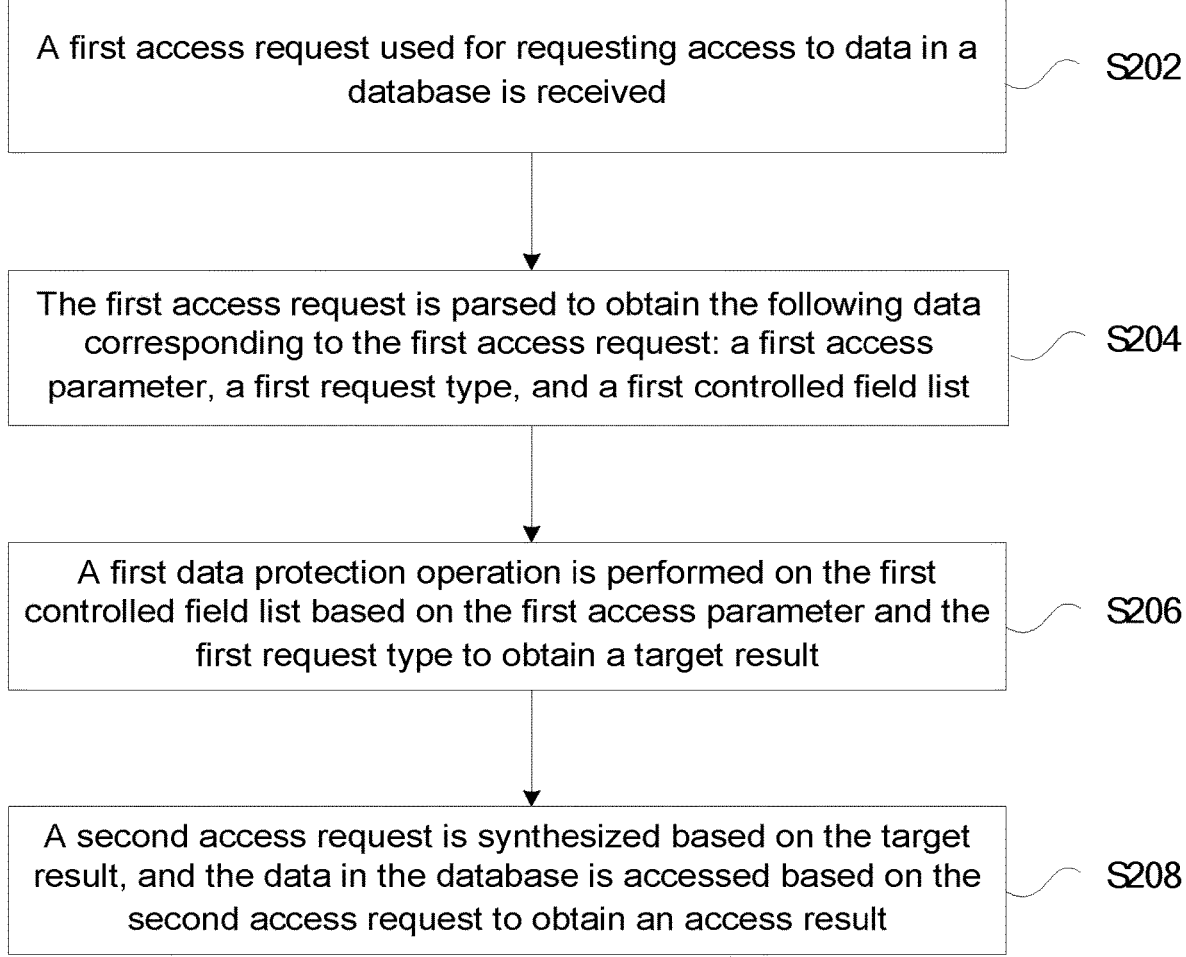

A first access request used for requesting access to data in a database is received — S202

The first access request is parsed to obtain the following data corresponding to the first access request: a first access parameter, a first request type, and a first controlled field list — S204

A first data protection operation is performed on the first controlled field list based on the first access parameter and the first request type to obtain a target result — S206

A second access request is synthesized based on the target result, and the data in the database is accessed based on the second access request to obtain an access result — S208

Fig. 2

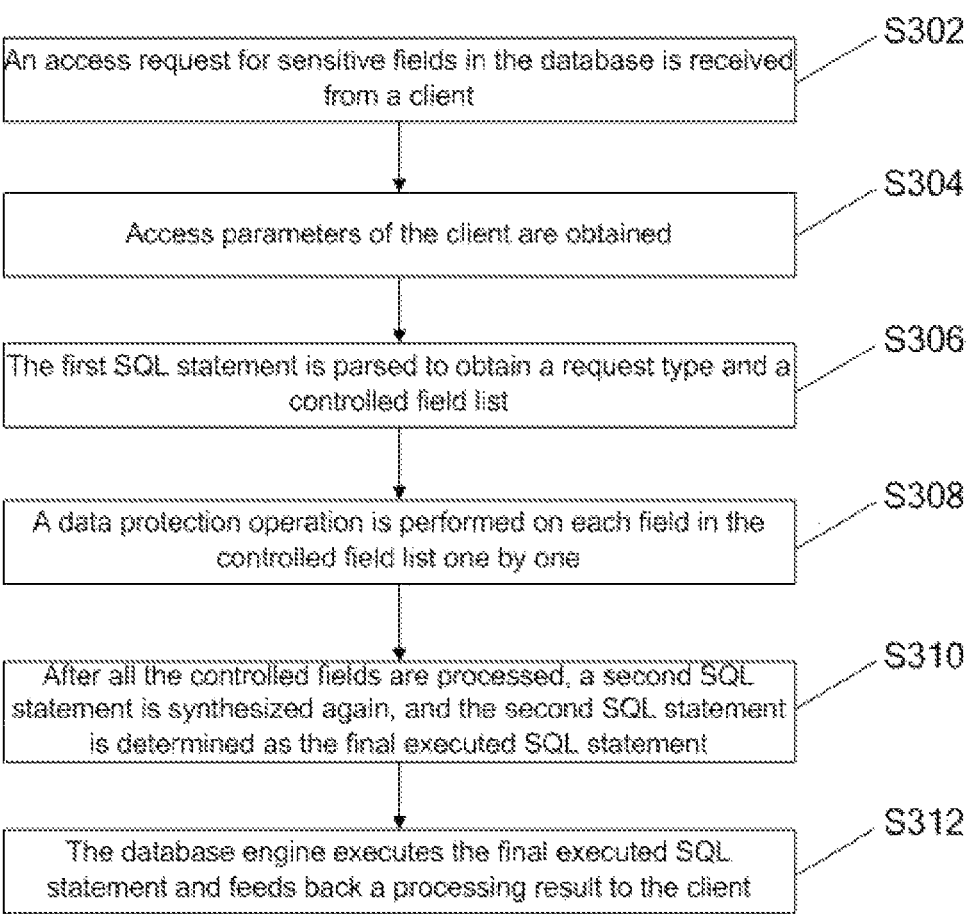

An access request for sensitive fields in the database is received from a client — S302

Access parameters of the client are obtained — S304

The first SQL statement is parsed to obtain a request type and a controlled field list — S306

A data protection operation is performed on each field in the controlled field list one by one — S308

After all the controlled fields are processed, a second SQL statement is synthesized again, and the second SQL statement is determined as the final executed SQL statement — S310

The database engine executes the final executed SQL statement and feeds back a processing result to the client — S312

Fig. 3

DATA ACCESS METHOD AND DEVICE, STORAGE MEDIUM, AND ELECTRONIC DEVICE

CROSS-REFERENCE TO RELATED APPLICATION

The present disclosure is based upon and claims priority to Chinese patent application No. CN202010688666.6, filed on Jul. 16, 2020 and entitled "Data Access Method and Device, Storage Medium, and Electronic Device", the disclosure of which is hereby incorporated by reference in its entirety.

TECHNICAL FIELD

Embodiments of the present disclosure relate to the field of communications, and in particular to a data access method and device, a storage medium, and an electronic device.

BACKGROUND

With the advent of the era of big data, the problem of the leakage of users' privacy is becoming more and more serious. At the same time, various big data technologies emerge one after another, and new technical architectures, supporting platforms and big data software constantly emerge, which makes data security and privacy protection technologies face greater challenges.

In the related art, access control and transparent encryption technologies are often used to protect certain highly sensitive information (such as credit cards, names and ID numbers, or other data considered critical). By performing data encryption at a database layer, the transparent encryption technology prevents possible attackers from bypassing a database and reading the sensitive information directly from storage. Applications and users that pass database permission verification can continue to access encrypted data transparently, while operating system users trying to read sensitive data in table space files and lawbreakers trying to read disk or backup information will not be allowed to access plaintext data. At the same time, privileged accounts can access any application data in the database. Because the privileged accounts and roles can access the database without restrictions, they are also a main target of hackers and can also be abused by insiders to obtain confidential information. Transparent encryption and permission are often invalid for privileged users. Therefore, only permission is used as the premise and main means of sensitive field protection in the related art, which has coarse granularity of protection and potential security risks.

It can be seen that there are problems of coarse granularity of data protection and potential security risks in the related art.

For the above problem existing in related technologies, no effective solution has been put forward.

SUMMARY

The embodiments of the present disclosure provide a data access method and device, a storage medium, and an electronic device to at least solve the problems of coarse granularity of data protection and potential security risks in the related art.

According to an embodiment of the present disclosure, a data access method is provided, which may include the following operations. A first access request used for requesting access to data in a database is received. The first access request is parsed to obtain the following data corresponding to the first access request: a first access parameter, a first request type, and a first controlled field list. A first data protection operation is performed on the first controlled field list based on the first access parameter and the first request type to obtain a target result. A second access request is synthesized based on the target result, and the data in the database is accessed based on the second access request to obtain an access result.

According to another embodiment of the present disclosure, a data access device is provided, which may include: a receiving module, an obtaining module, a performing module, and an accessing module. The receiving module is configured to receive a first access request used for requesting access to data in a database. The obtaining module is configured to parse the first access request to obtain the following data corresponding to the first access request: a first access parameter, a first request type, and a first controlled field list. The performing module is configured to perform a first data protection operation on the first controlled field list based on the first access parameter and the first request type to obtain a target result. The accessing module is configured to synthesize a second access request based on the target result, and access the data in the database based on the second access request to obtain an access result.

According to yet another embodiment of the present disclosure, a computer-readable storage medium is also provided, in which a computer program is stored. The computer program is configured to execute, when running, the steps in any above method embodiment.

According to yet another embodiment of the present disclosure, an electronic device is also provided, which may include a memory and a processor. The memory stores a computer program. The processor is configured to run the computer program to execute the steps in any above method embodiment.

BRIEF DESCRIPTION OF THE DRAWINGS

FIG. 2 is a flowchart of a data access method according to an embodiment of the present disclosure.

FIG. 3 is a flowchart of a data access method according to a specific embodiment of the present disclosure.

DETAILED DESCRIPTION OF THE EMBODIMENTS

The present disclosure is elaborated below with reference to the accompanying drawings and embodiments.

It is to be noted that the terms like "first" and "second" in the specification, claims and accompanying drawings of the present disclosure are used for differentiating the similar objects, but do not have to describe a specific order or a sequence.

Figure 1:
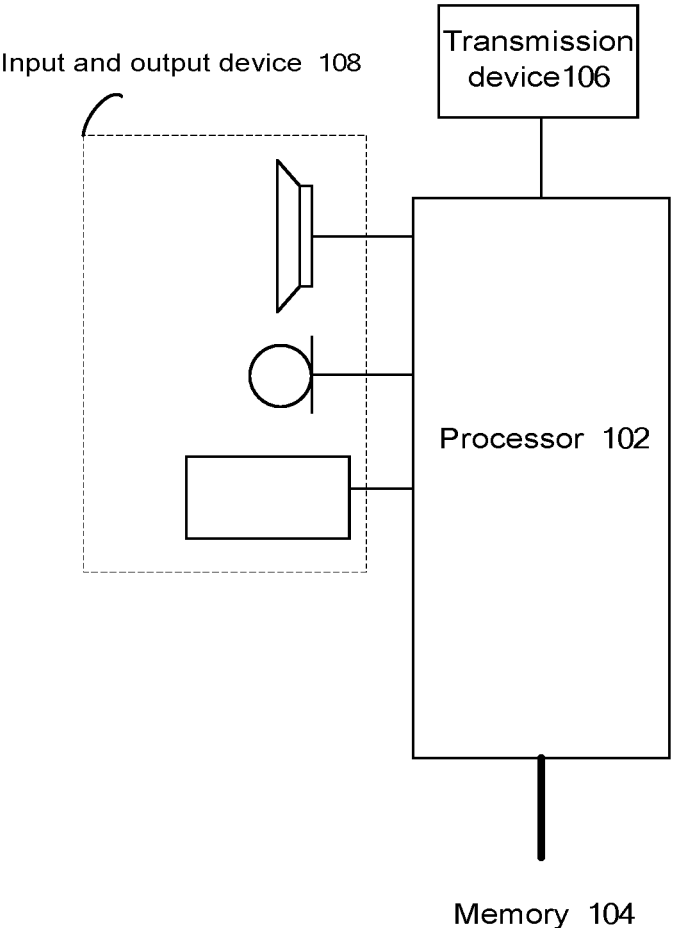
FIG. 1 is a structural block diagram of hardware of a mobile terminal for a data access method according to an embodiment of the present disclosure.

The method embodiment provided by the embodiments of the present disclosure may be performed in a mobile terminal, a computer terminal or similar operating devices. Taking that the method is performed on the mobile terminal, FIG. 1 is a structural block diagram of hardware of a mobile terminal for a data access method according to an embodiment of the present disclosure. As shown in FIG. 1, the mobile terminal may include one or more (only one is shown in FIG. 1) processors 102 (the processors 102 may include, but are not limited to, a Micro Processor Unit (MCU) or a Field Programmable Gate Array (FPGA), and other processing devices), a memory 104 configured to store data. The mobile terminal may also include a transmission device 106 with a communication function and an input and output device 108. Those of ordinary skill in the art should know that the structure shown in FIG. 1 is only schematic and not intended to limit the structure of the mobile terminal. For example, the mobile terminal may also include more or less components than that in FIG. 1, or has a configuration different from that in FIG. 1.

The memory 104 may be configured to store a computer program, for example, a software program and a module of application software, for example, a computer program corresponding to the data access method in the embodiments of the present disclosure. The processor 102 runs the computer program stored in the memory 104, thereby executing various functional applications and data processing, namely implementing the above method. The memory 104 may include a high-speed random access memory and may also include a nonvolatile memory, for example, one or more magnetic storage devices, flash memories or other nonvolatile solid-state memories. In some examples, the memories 104 may further include memories remotely set relative to the processor 102, and these remote memories may be connected to the mobile terminal through the network. Examples of the networks include, but are not limited to, the Internet, the Intranet, a local area network, a mobile communication network and a combination thereof.

The transmission device 106 is configured to receive or send data through a network. A specific example of the network may include a wireless network provided by a communication provider of the mobile terminal. In an example, the transmission device 106 includes a Network Interface Controller (NIC), which may be connected with other network devices through a base station, thereby communicating with the Internet. In an example, the transmission device 106 may be a Radio Frequency (RF) module, which is configured to communicate with the Internet in a wireless manner.

A data access method is provided in an embodiment. FIG. 2 is a flowchart of the data access method according to an embodiment of the disclosure. As shown in FIG. 2, the flow may include the following steps.

At S202, a first access request used for requesting access to data in a database is received.

At S204, the first access request is parsed to obtain the following data corresponding to the first access request: a first access parameter, a first request type, and a first controlled field list.

At S206, a first data protection operation is performed on the first controlled field list based on the first access parameter and the first request type to obtain a target result.

At S208, a second access request is synthesized based on the target result, and the data in the database is accessed based on the second access request to obtain an access result.

In the above embodiment, the first access request may be a Structured Query Language (SQL) type. After receiving the SQL of a client, the SQL may be parsed to obtain the access parameters, request types, and controlled field list of the client. Then, the data protection operation may be performed on each field in the controlled field list one by one, that is, the first data protection operation is performed; after all the controlled fields are processed, a first SQL statement is synthesized again to obtain the second access request, and a database engine executes the first SQL statement and feeds back a feedback result to the client. The client may be a variety of applications, programs, commands, or scripts that access the database.

In the above embodiment, the access parameters include, but are not limited to: original requests such as request SQL; user IDs such as user name, user group, and role; user access level; access time; and network parameters such as IP address and host name.

Through the present disclosure, the first access request used for requesting access to the data in the database is parsed to obtain the first access parameter, the first request type, and the first controlled field list corresponding to the first access request, the first data protection operation is performed on the first controlled field list based on the first access parameter and the first request type to obtain the target result, and then the second access request is synthesized based on the target result, and the data in the database is accessed using the second access request. Because a field-level data protection operation is performed on the access data, the problems of coarse granularity of data protection and potential security risks in the related art may be solved, the effect of efficient data protection may be achieved, and the security of data may be improved.

In an exemplary embodiment, that the access request is parsed to obtain the first controlled field list corresponding to the first access request may include the following operations. In the case that the first access request is a request of Data Query Language (DQL) type, a top-level output field list of the request of DQL type is determined as the first controlled field list. In the case that the first access request is a request other than the request of DQL type, a target field list operated by the other request is determined, and the target field list is determined as the first controlled field list. In the present embodiment, for the request of DQL (select query) type, its top-level output field list may be obtained first, and then the top-level output field list is taken as the controlled field list; for the requests of other types, the fields operated by the SQL statement may be parsed first, and the operated fields are added to the controlled field list.

For example, for the following request of DQL type:
Select ename, deptno, sal
from emp
where deptno=
(select deptno from dept where loc='NEW YORK'),
the controlled field list obtained is:
emp.ename, dept.deptno, emp.sal.
For another example, for the following update request of Data Manipulation Language (DML) type:
UPDATE Customers SET ContactName='Alfred Schmidt',
City='Frankfurt'
WHERE CustomerID=1,
the controlled field list obtained is:
Customers.ContactName, Customers.City.

In an exemplary embodiment, that a first data protection operation is performed on the first controlled field list based on the first access parameter and the first request type to obtain a target result may include the following operations. A controlled field is selected from the first controlled field list in a preset order as a first controlled field. A first field protection rule, data security classification and data security level corresponding to the first controlled field are determined. Different field protection rules correspond to different combinations of trust condition, request type and processing action, and the trust conditions include an access permission condition corresponding to the first access parameter. The first data protection operation is performed on the first controlled field based on the corresponding first processing action in the first field protection rule to obtain the target result. In the present embodiment, the first controlled field may be selected from the controlled field list in the preset order, and the field protection rule corresponding to the first controlled field may be obtained. The field protection rule may include the data security classification, the data security level, etc. The data security level corresponding to the controlled field may be determined by determining the field protection rule. The data security level itself may be used as a trust condition contained in a set of trust conditions, that is, whether the user security level is greater than or equal to the data security level may be judged. In the present embodiment, classified protection is performed on the first controlled field, and the same protection rule and data security level may be set for the same type of fields. When the obtained data security level of the first controlled field is null, the data security level of the data security classification of the first controlled field may be obtained as the data level of the first controlled field; or, when the obtained data security level of the first controlled field is null, the field protection rule of the data classification of the first controlled field may also be obtained as the protection rule of the first controlled field.

In an exemplary embodiment, that the first data protection operation is performed on the first controlled field based on the corresponding first processing action in the first field protection rule to obtain the target result may include the following operations. A set of trust conditions corresponding to the first field protection rule are obtained based on the first access parameters obtained. The first access parameters include at least one of the following: original request statement, user ID, user access level, access time, and network parameter. A first action type and a first action factor included in the first processing action are determined according to a set of trust condition execution results. The first action type is used for indicating a specific protection operation, and the first action factor is used for indicating an operator name of the specific protection operation and an actual parameter to be processed. The first controlled field is protected based on the first action factor to obtain the target result. In the present embodiment, a set of trust conditions corresponding to the field protection rule of the first controlled field are executed according to the obtained first access parameters, the corresponding action type is selected according to a trust condition calculation result, and the specific protection operation factor is executed. The above first processing action represents a protection method performed on sensitive data, including action types and action factors. The action types may include: denying access, permitting access, displaying raw data, desensitizing, encrypting, decrypting, anonymizing, auditing, alarming, custom action, etc. The action factors may represent the operator name of the specific protection operation executed and the actual parameters. The actual parameters mainly include the content to be processed in the first controlled field. It is to be noted that the action types and the action factors may be extended in a customized manner to deal with data protection in different scenarios. For the action of denying execution, a result may be directly fed back to the client, and the process is exited.

In an exemplary embodiment, that the first controlled field is protected based on the first action factor to obtain the target result may include the following operation. In the case that the first processing action types include one of desensitization action, encryption action, decryption action, anonymization action and customized action, the first controlled field is synthesized into a new SQL statement field based on the first action factor to obtain the target result. In the present embodiment, for the desensitization action, the encryption action, the decryption action, the anonymization action, the custom action, etc., a new SQL statement field may be synthesized according to the action factor in the field protection rule to replace the original corresponding SQL statement field.

In an exemplary embodiment, the method may also include the following operations. The field protection rule is configured based on a first configuration instruction received. The field protection rule includes a combination of request type, a set of trust conditions and processing action. The request types include at least one of the following: DQL type and DML type. The trust conditions are used for defining a basic judgment unit of trusted access, at least including trusted access types, trusted access parameter names, judgment operators and parameter values. The trusted access types include at least one of the following: ID trust condition, level trust condition, network trust condition, and time trust condition. The judgment operators include greater than, greater than or equal to, less than or equal to, less than, equal to, not equal to. The processing action includes an action type and an action factor. The action type is used for indicating the specific protection operation, and the action factor is used for indicating the operator name of the specific protection operation and the actual parameter to be processed. The action types include at least one of the following: denying access, permitting access, displaying the raw data, desensitization processing, encryption processing, decryption processing, anonymization processing, audit processing, and alarm processing. In the present embodiment, the field protection rule may be configured and recorded according to the first configuration instruction. The field protection rule includes a combination of request type, trust condition and processing action. The processing action may include the action type and the action factor. The field protection rule may define different field protection methods for different command types (namely request types), and is composed of the command types and logical operation expressions of a set of trust conditions. The corresponding processing action is executed according to a set of trust condition execution results. The command types at least include the DQL type, the DML type, etc. The logical operations may include AND operation, OR operation, NOT operation, etc.

In an exemplary embodiment, in the case that the first access parameters include the user access level, the trust conditions include the level trust condition corresponding to the user access level. The level trust condition is used for determining that the user access level satisfies the level trust condition when it is determined that the user access level is greater than or equal to the data security level. In the present embodiment, the trust conditions may define the basic judgment unit of trusted access. The basic judgment unit may include at least one of the following:

the ID trust condition, which is used for restricting the user IDs, including but not limited to user name, user group, role, etc.;

the level trust condition, which restricts users from obtaining the sensitive data according to the user access level, the data security level, and the data security classification;

the network trust condition, which is used for restricting access to the network, including but not limited to an IP address, a host name, etc.;

the time trust condition, which is used for restricting the access time, including but not limited to access time, etc.

The user access level may be used for describing a user ID level, including a user access level name and a user access level value. It is to be noted that data types of the user access level and the data security level are the same and need to maintain the same order. The trust conditions may include the trusted access types, the trusted access parameter names, the judgment operators and the parameter values. The judgment operators may include greater than, greater than or equal to, less than or equal to, less than, equal to, not equal to, etc.

In an exemplary embodiment, the method may also include the following operation. The data security classification and data security level corresponding to each controlled field are configured based on a second configuration instruction received. Multiple controlled fields under the same data security classification correspond to the same data security level. In the present embodiment, the data security classification may be performed according to the service type of the sensitive data, and may include a class name, a default data security level, and a default field protection rule. The data security levels may include a data security level name and a data security level value.

In the above embodiment, the field protection rule may be set through the following steps.

At S1, classification and grading levels (including the user access level, the data security level, and the data security classification) are defined.

At S2, the user access level is set.

At S3, the data protection category and the data security level are assigned to sensitive fields.

At S4, the trust condition is set.

At S5, the field protection rule is set.

In an optional embodiment, the above method may be run in a data access device. The device may include a data protection module and a policy module to realize a sensitive data protection function of the database engine. The device may be built in the database engine. The data protection module may obtain a sensitive data protection policy from the policy module, and perform corresponding data protection operations, such as denying access, complete desensitization, partial desensitization, encryption, anonymization, auditing, alarming, etc. The policy module may include a classification and grading unit, a policy management unit and a policy storage unit, which provide policy support for the data protection module. The classification and grading unit is configured to perform classification and grading management on users and data, including the user access level, the data security level, the data security category, etc. The policy management unit is responsible for managing the data protection policy and providing a policy access interface. The policy storage unit is responsible for storing the data protection policy.

Accessing data is described below in combination with specific implementation modes.

FIG. 3 is a flowchart of a data access method according to a specific embodiment of the present disclosure. As shown in FIG. 3, the flow may include the following steps.

At S302, an access request is received from a client.

At S304, access parameters of the client are obtained.

At S306, the access request of SQL type is parsed, and a request type and a controlled field list are obtained.

At S308, a data protection operation is performed on each field in the controlled field list one by one.

At S310, after all the controlled fields are processed, a first SQL statement is synthesized again.

At S312, the database engine executes the first SQL statement and feeds back a result to the client.

The client may be a variety of applications, programs, commands, or scripts that access the database, and its access parameters may include the following:

①   the original requests, including but not limited to the request of SQL type;

②   the user IDs, including but not limited to the user name, the user group, the role, etc.;

③   the user access level;

④   the access time; and

⑤   the network parameters, including but not limited to the IP address, the host name, etc.

The operation that the controlled field list is obtained in S306 may include the following operations.

For the request of DQL (select query) type, its top-level output field list is obtained first, and then the top-level output field list is taken as the controlled field list; for the requests of other types, the fields operated by the SQL statement are parsed first, and the operated fields are added to the controlled field list.

In S308, the data protection operation may include the following steps.

At S1, a first controlled field is selected from the controlled field list in a preset order.

At S2, the data security classification, data security level and field protection rule corresponding to the first controlled field are obtained.

It is to be noted that the sensitive fields are protected by type, and the same field protection rule and data security level may be set for the sensitive fields of the same type. If the obtained data security level of the first controlled field is null, the data security level of the data security classification of the first controlled field is obtained as the data level of the first controlled field. If the obtained field protection rule of the first controlled field is null, the field protection rule of the data classification of the first controlled field is obtained as the field protection rule of the first controlled field.

At S3, a set of trust conditions corresponding to the field protection rule of the first controlled field are executed, the corresponding action type is selected according to the trust condition calculation result, and the specific protection operation factor is executed. For example, for the action of denying execution, a result is directly fed back to the client, and the process is exited. For the desensitization action, the encryption action, the decryption action, the anonymization action, etc., a new SQL statement field is synthesized according to the action factor in the field protection rule to replace the original corresponding SQL statement field.

Figure 4:
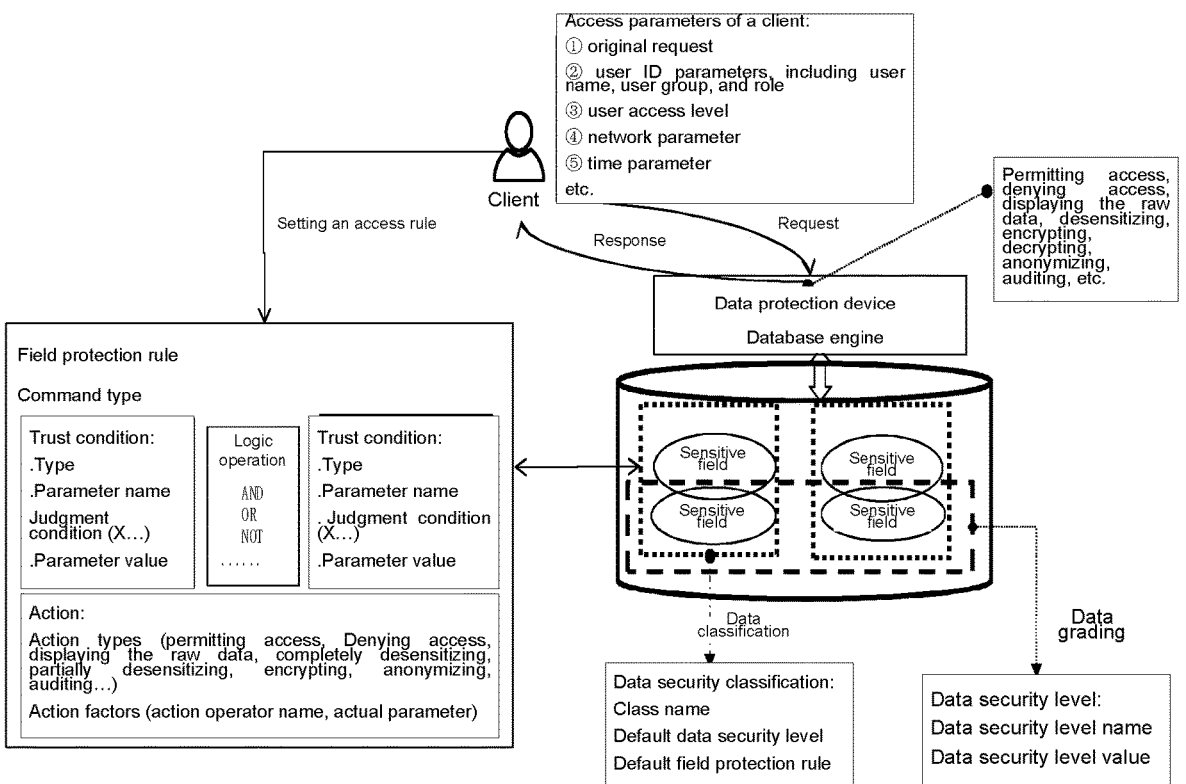
FIG. 4 is a work flowchart of managing a field-level security policy according to a specific embodiment of the present disclosure.

FIG. 4 is a work flowchart of managing a field-level security policy according to a specific embodiment of the present disclosure. As shown in FIG. 4, the flow may include: the field protection rule, the data security classification, the data security level, the access parameter of the client, etc.

The field protection rule is used for defining different field protection methods for different command types, and may include the command types and the logical operation expressions of a set of trust conditions. The corresponding processing action is executed according to a set of trust condition execution results. The command types at least include the DQL type, the DML type, etc. The logical operations include, but are not limited to, AND operation, OR operation, NOT operation, etc.

The trust conditions may define the basic judgment unit of trusted access, including at least one of the following:

the ID trust condition, which is used for restricting the user IDs, including but not limited to user name, user group, role, etc.;

the level trust condition, which restricts users from obtaining the sensitive data according to the user access level, the data security level, and the data security classification;

the network trust condition, which is used for restricting access to the network, including but not limited to an IP address, a host name, etc.; and the time trust condition, which is used for restricting the access time, including but not limited to access time, etc.

The trust conditions at least include the trusted access types, the trusted access parameter names, the judgment operators and the parameter values. The judgment operators include greater than, greater than or equal to, less than or equal to, less than, equal to, not equal to, etc.

The processing action represents the protection method performed on the sensitive data, including the action types and the action factors. The action types include at least one of the following: denying access, permitting access, displaying the raw data, desensitizing, encrypting, decrypting, anonymizing, auditing, alarming, custom action, etc. The action factor represents the operator name of the specific protection operation executed and the actual parameter. It is to be noted that the action types and the action factors may be extended in a customized manner to deal with data protection in different scenarios.

The data security classification may be performed according to the service type of the sensitive data, and at least include the class name, the default data security level, and the default field protection rule.

The data security levels at least include the data security level name and the data security level value.

The parameters that may be included in the access parameters of the client are basically similar to the above access parameters of the client and will not be described here. The user access level is used for describing the user ID level, including at least the user access level name and the user access level value. It is to be noted that the data types of the user access level and the data security level are the same and need to maintain the same order.

By using the above steps, a field-level access control and attack defense function may be flexibly and effectively provided based on policies, multiple command types may be supported, authorized access to the sensitive data may be supported based on a combination of trusted factors, sensitive data access authorization or dynamic data acquisition may be realized based on the user name, the IP address, the access time and other elements, and according to data confidentiality levels and user ID levels, it is possible to limit the users to only obtain fully decrypted original data, partially desensitized data, label data, anonymized data, and so on that they are allowed to access, so that the same sensitive data is differently displayed to different users, thus effectively blocking illegal access.

At the same time, the processing capability of the database engine itself may be directly used to protect private data efficiently, in real time and transparently, and users may be completely unaware of the data protection process.

Figure 5:
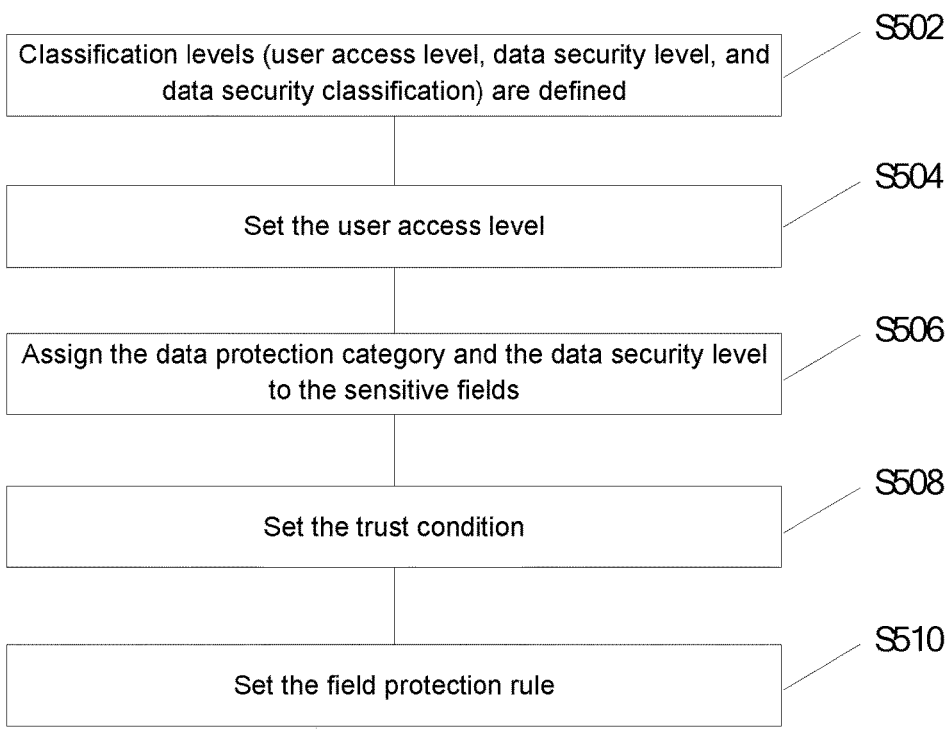
FIG. 5 is a flowchart of a field-level security policy according to a specific embodiment of the present disclosure.

FIG. 5 is a flowchart of a field-level security policy according to a specific embodiment of the present disclosure. As shown in FIG. 5, the flow may include the following steps.

At S502, the classification and grading levels are defined.

At S502-1, the user access level is defined.

Users may be classified according to their permission levels, or according to user group types (such as low-privilege user group, partially authorized user group, or high-privilege user group), or according to geographical locations (such as China, Europe, or North America). As shown in Table 1, Table 1 is a schematic table of classified user access levels.

TABLE 1

| User access levels | Values | Notes |
| --- | --- | --- |
| LOWLEVEL | 0 | Low-privilege user |
| MIDDLEVEL | 5 | Partially authorized user |
| HIGHLEVEL | 10 | High-privilege user |

At S502-2, the data security level is defined.

The sensitive fields may be classified according to data confidentiality (such as public, secret, confidential, or top secret), or according to the department to which the data belongs (core department data, non-core department data). As shown in Table 2, Table 2 is a schematic table of data security levels.

TABLE 2

| Data security levels | Values | Notes |
| --- | --- | --- |
| PUBLIC | 0 | Public |
| SECRET | 2 | Secret |
| CONFIDENTIAL | 5 | Confidential |
| TOPSECRET | 10 | Top secret |

At S502-3, the data security classification is defined.

The data protection classification is used for classifying the sensitive data, and identifying the data with similar functional meanings by type. For example, as a type of sensitive data, "ID number" data fields in all databases are managed, and the unified default data level and default field protection rule may be implemented. As shown in Table 3, Table 3 is a schematic table of data security levels.

TABLE 3

| Data security classifications | Default data protection levels | Default field protection rules | Notes |
| --- | --- | --- | --- |
| ID | SECRET | Rule1 | Type of ID number |
| NAME | SECRET | Rule2 | Type of name |
| ADDRESS | SECRET | Rule3 | Type of address |
| CARD | TOPSECRET | Rule4 | Type of card |

At S504, the user access level is set.

As shown in Table 4, Table 4 is a schematic table of assigned user access levels.

TABLE 4

| User names | User access levels |
| --- | --- |
| Zhang San | LOWLEVEL |
| Li Si | MIDDLEVEL |
| Wang Wu | HIGHLEVEL |

At S506, the data protection category and the data security level are assigned to the sensitive fields.

As shown in Table 5, Table 5 is a schematic table of assigning the data protection categories and the data security levels to the sensitive fields.

TABLE 5

| Databases | Tables | Fields | Data security levels | Data protection classifications |
| --- | --- | --- | --- | --- |
| DBS1 | T1 | f1 | SECRET | ID |
| DBS1 | T1 | f2 | SECRET | NAME |
| DBS1 | T1 | f3 |  | ADDRESS |
| DBS1 | T1 | f4 | TOPSECRET | CARD |

At S508, the trust condition is set.

As shown in Table 6, Table 6 is a schematic table of the trust condition.

TABLE 6

| Trust condition ID | Trust condition types | Trusted condition parameter names | Judgment operators | Parameter values |
| --- | --- | --- | --- | --- |
| Selector1 | ID trust condition | username | = | Zhang San |
| Selector2 | Level trust condition | datalable | < | Data protection level value of field (e.g. confidential) |
| Selector3 | Time trust condition | time | > | 00:00 |

At S510, the field protection rule is set.

The field protection rule defines different field protection methods for different command types, and may include the command types and the logical operation expressions of a set of trust conditions. The corresponding processing action is executed according to a set of trust condition execution results.

As shown in Table 7, Table 7 is a schematic table of the field protection rule.

TABLE 7

| Databases | Tables | Fields | Command types | Trust conditions | Actions |
| --- | --- | --- | --- | --- | --- |
| DBS1 | T1 | f1 | select | Selector | Action1 |
| DBS1 | T1 | f2 | insert | Selector2 | Action2 |
| DBS1 | T1 | f3 | update | (Selector)||(Selector3) | Action3 |

As shown in Table 8, Table 8 is a schematic table of the processing action.

TABLE 8

| Action ID | Action types | Action factors |
| --- | --- | --- |
| Action1 | Denying access |  |
| Action2 | Desensitization | partialMask(XXX, 1, '*', 100) |
| Action3 | Anonymization | K-Anonymity(f, 3) |

The above methods may flexibly and effectively provide protection policies, flexibly control the access mode and access content of the database according to the policies, and effectively block illegal access.

Figure 6:
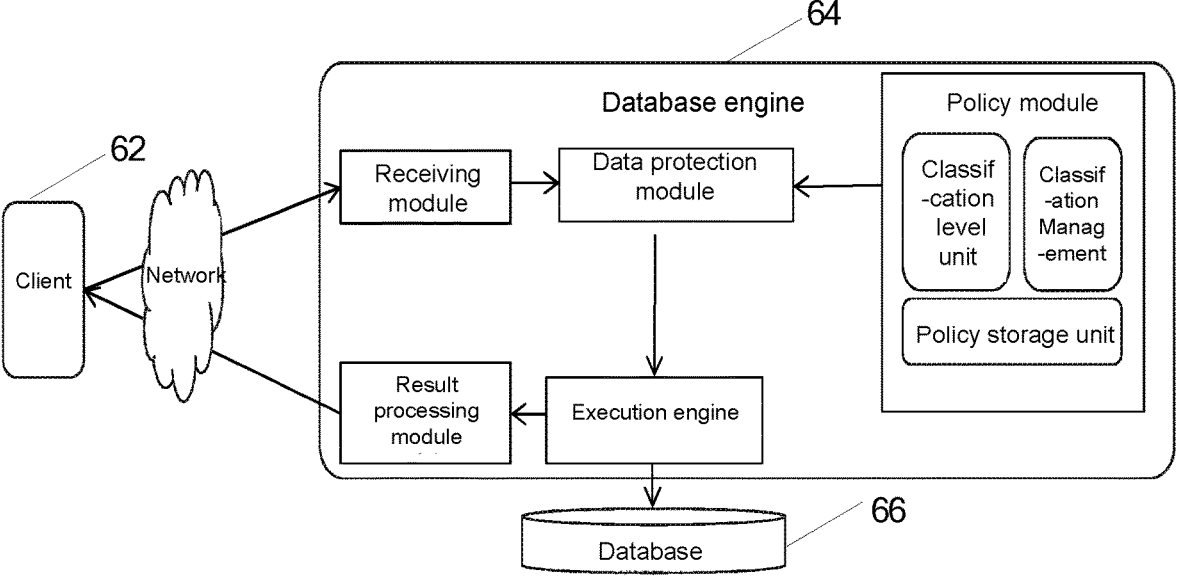
FIG. 6 is a structure diagram of a data protection device according to a specific embodiment of the present disclosure.

FIG. 6 is a structure diagram of a data protection device according to a specific embodiment of the present disclosure. The above methods may all be run on the network architecture shown in FIG. 6. As shown in FIG. 6, the device may include: a database client 62, a database engine 64, and a database 66.

The database client 62 may be an application, program, command or script that accesses database services, initiates an access request to the database engine through the network and receives a processing result. The client adopts the existing technology and does not need to make any changes.

The database engine 64 is responsible for completing service logic processing requested by the client. The data protection device may be added to the database engine. The device may include a data protection module and a policy module to realize the sensitive data protection function of the database engine. The data protection device is built in the database engine. The data protection module may obtain the sensitive data protection policy from the policy module, and perform the corresponding data protection operations, such as denying access, desensitization, encryption, decryption, anonymization, auditing, alarming, etc. The policy module may include a classification and grading unit, a policy management unit and a policy storage unit, which provide policy support for the data protection module. The classification and grading unit is configured to perform classification and grading management on users and data, including the user access level, the data security level, the data security category, etc. The policy management unit is responsible for managing the data protection policy and providing a policy access interface. The policy storage unit is responsible for storing the data protection policy.

The database 66 may be the place where the data is actually stored. One database engine may support multiple database instances. After the database engine receives the access request from the client, a receiving module parses the access request to obtain the access parameters of the client, and the data protection module parses the access request of SQL type, obtains the request type and the controlled field list, and performs the data protection operation on each field in the controlled field list one by one. After all the controlled fields are processed, the first SQL statement is synthesized again, and the database engine executes the first SQL statement and feeds the result back to the client.

Figure 7:
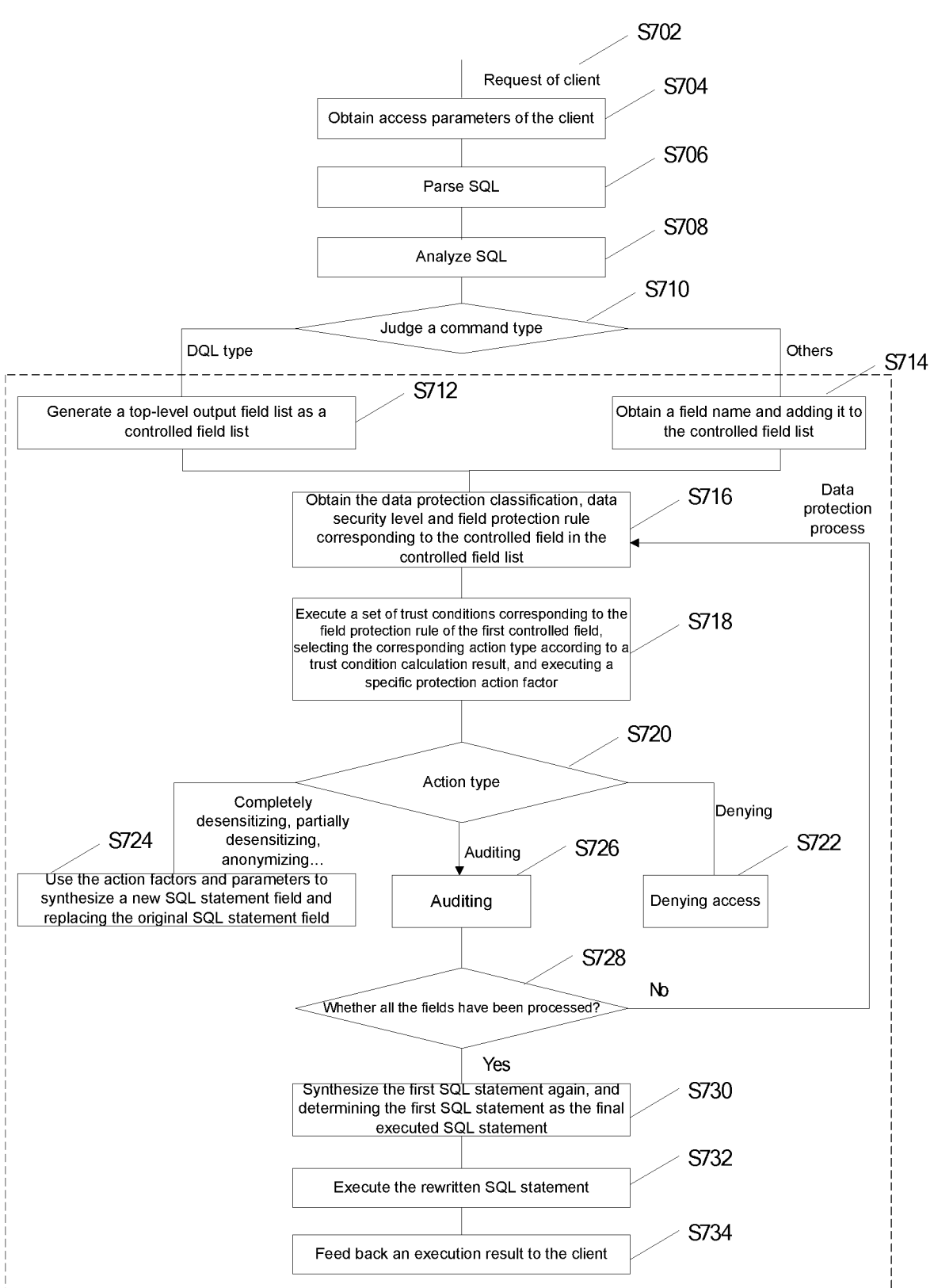
FIG. 7 is a flowchart of a data access method according to a specific embodiment of the present disclosure.

For the database engine of SQL type (including but not limited to Hive, SparkSQL, etc.), taking the Hive database as an example, FIG. 7 is a flowchart of a data access method according to a specific embodiment of the present disclosure. As shown in FIG. 7, the flow may include the following steps.

At S702, a Hive (Hive is a data warehouse tool based on hadoop which may map a structured data file into a database table and provide an SQL-like query function) client initiates the access request of SQL type directly to the Hive database engine through the network.

At S704, the Hive database engine obtains the access parameters of the client. The access parameters include at least one of the following:

① the original requests, including but not limited to the request of SQL type;

② the user IDs, including but not limited to the user name, the user group, the role, etc.;

③ the user access level;

④ the access time; and

⑤ the network parameters, including but not limited to the IP address, the host name, etc.

At S706, an SQL parser of the Hive database engine parses the SQL statements in the original request, constructs a syntax tree, and further abstracts and structures the SQL to generate a reconstructed abstract syntax tree.

At S708, the abstract syntax tree is parsed, the request SQL statement is parsed, the request type of the SQL statement is obtained, the top-level output field list of the request of DQL type is obtained as the controlled field list, the fields operated by the SQL statement are parsed first for the requests of other types, and the operated fields are added to the controlled field list.

At S710, the command type is determined; when the command type is DQL type, S712 is executed; and when command type is non-DQL type, S714 is executed.

At S712, the top-level output field list is generated as the controlled field list.

Taking the query statement of DQL type as an example,
select ename, deptno, sal
from emp
where deptno=
(select deptno from dept where loc='NEW YORK').
In this step, the controlled field list obtained is:
emp.ename, dept.deptno, emp.sal,
where emp, dept is a database table name, others are field names.

At S714, the field names are obtained and added to the controlled field list.

Taking the update statement of DML type as an example,
UPDATE Customers SET ContactName='Alfred Schmidt', City='Frankfurt'
WHERE CustomerID=1.
In this step, the controlled field list obtained is:
Customers.ContactName, Customers.City,
where Customers is the database table name, and others are the field names.

At S716, the first controlled field is selected from the controlled field list in the preset order, and the data protection classification, data security level and field protection rule corresponding to the first controlled field are obtained.

As shown in Table 9, Table 9 is a schematic table of the obtained field protection rule.

TABLE 9

| Data-bases | Tables | Fields | Command types | Rules | Actions |
|------|--------|--------|-------|-------|---------|
| DBS | emp | ename | select | Selector2 | Action1 |
| DBS | emp | sal | insert | Selector1 | Action2 |
| DBS | dep | id | update | (Selector1)\|\|(Selector3) | Action3 |
| . . . | . . . | . . . | .. | . . . | . . . |

In particular, if the obtained data security level of the first controlled field is null, the data security level of the data classification of the first controlled field is obtained as the data security level of the first controlled field.

In particular, if the obtained field protection rule of the first controlled field is null, the field protection rule of the data classification of the first controlled field is obtained as the protection rule of the first controlled field.

At S718, a set of trust conditions corresponding to the field protection rule of the first controlled field are executed, the corresponding action type is selected according to the trust condition calculation result, and the specific protection operation factor is executed.

At S720, the action type is determined; if the action type is denying execution, S722 is executed; if the action type is desensitization, encryption, decryption, anonymization, etc., S724 is executed; and if the action type is auditing, S726 is executed.

At S722, the result is directly fed back to the client, and the process is exited.

At S724, a new SQL statement field is synthesized according to the action factor in the field protection rule to replace the original corresponding SQL statement field.

For example, for the field ename, its protection rule of select statement type is Selector2→Action1; Selector2 judgment is performed, that is, whether the user access level value is less than the data protection level value is judged; if so, the Action1 action is executed, namely execution is denied; or else, execution is continued. For the field sal, its protection rule of select statement type is: Selector1→Action2; Selector1 judgment is performed, that is, whether the user is Zhang San is judged; if so, the Action2 action is executed, that is, partialMask(sal,1, '*',100) is used as a partial desensitization algorithm. In this step, the SQL statement partialMask(sal,1, '*',100) replaces the original value sal of a node of the abstract syntax tree corresponding to the controlled field sal.

At S726, auditing is performed.

At S728, whether all the fields have been processed is judged; if the judgment result is yes, S730 is executed; if the judgment result is no, S716 is executed.

At S730, the abstract syntax tree is traversed, the first SQL statement is synthesized again, and it is determined that the first SQL statement is the final executed SQL statement:
select ename, deptno, partialMask(sal, 1, '*', 100)
from emp
where deptno=
(select deptno from dept where loc='NEW YORK').
The rewritten SQL statement partially desensitizes the sensitive field sal automatically.

Similarly, for the following SQL statement:
UPDATE Customers SET ContactName='Alfred Schmidt', City='Frankfurt'
WHERE CustomerID=1,
it may be rewritten according to the protection rule as:
UPDATE Customers SET ContactName=Mask('Alfred Schmidt', '*'), City='Frankfurt'
WHERE CustomerID=1,
where Mask is the protection factor, and a character string is set to *.

At S732, the database executes the rewritten SQL statement.

At S734, the database relies on the final executed SQL statement and feeds back the processing result to the client.

By using the above steps, the field-level access control and attack defense function may be flexibly and effectively provided based on policies, multiple command types may be supported, authorized access to the sensitive data may be supported based on a combination of trusted factors, sensitive data access authorization or dynamic data acquisition may be realized based on the user name, the IP address, the access time and other elements, and according to data confidentiality levels and user ID levels, it is possible to limit the users to only obtain fully decrypted original data, partially desensitized data, label data, anonymized data, and so on that they are allowed to access, so that the same sensitive data is differently displayed to different users, thus effectively blocking illegal access. At the same time, the processing capability of the database engine itself may be directly used to protect private data efficiently, in real time and transparently, and users may be completely unaware of the data protection process.

Figure 8:
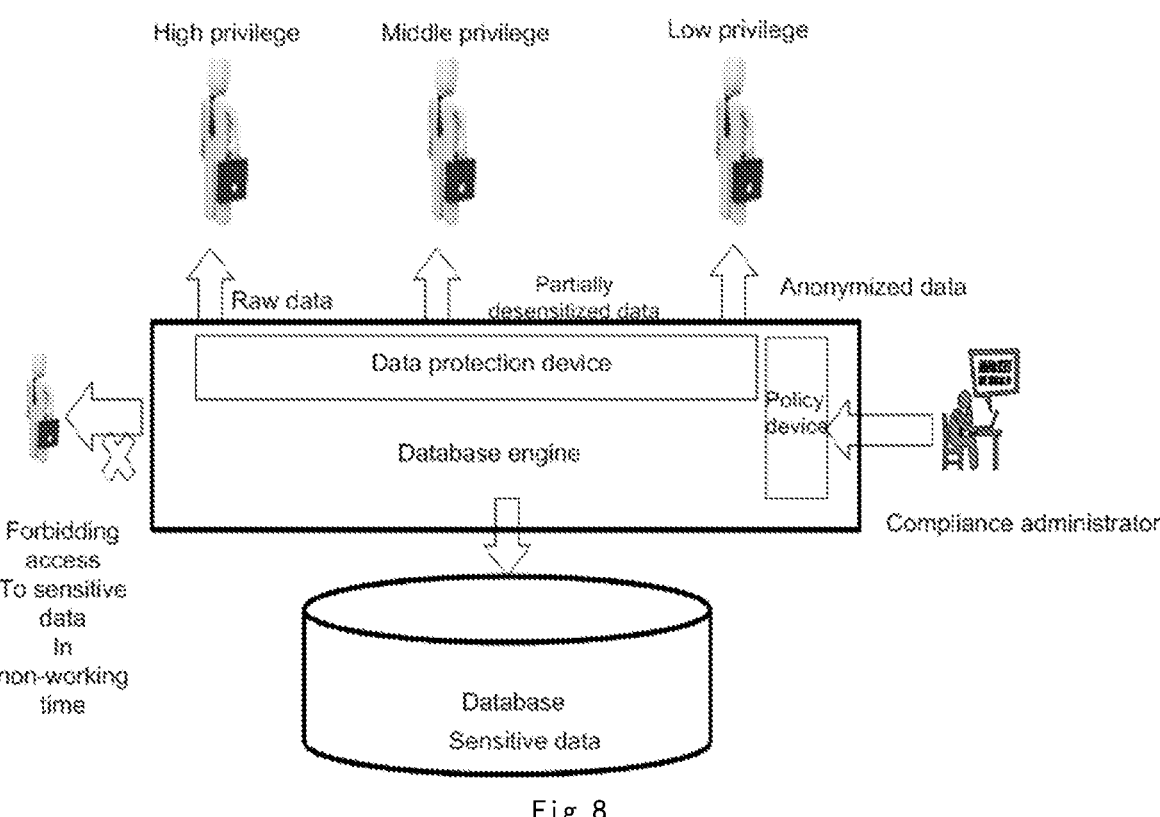
FIG. 8 is a schematic diagram of an implementation scenario of a data access method according to a specific embodiment of the present disclosure.

The Hive database stores a large amount of sensitive data. By setting the flexible data protection policies, the sensitive data in the Hive database may be transparently protected in real time during the access of the client. FIG. 8 is a schematic diagram of an implementation scenario of a data access method according to a specific embodiment of the present disclosure, including the following steps.

At S1, logging in. Specifically, a compliance administrator logs in to a database system with his/her own account and password.

At S2, a protection policy is set. Specifically, the compliance administrator sets a field protection policy through command or interface configuration.

At S3, a user initiates an access request through the client. Specifically, the user initiates a query request directly to the database engine.

At S4, data protection is performed. Specifically, after the database engine receives the access request from the client, the receiving module parses the access request to obtain the access parameters of the client, and the data protection module parses the access request of SQL type, obtains the request type and the controlled field list, and performs the data protection operation on each field in the controlled field list one by one. After all the controlled fields are processed, the first SQL statement is synthesized again, and the database engine executes the first SQL statement and feeds the result back to the client.

S1 and S2 are executed by the compliance administrator, S3 is executed by the user, and S4 is executed by the data protection device.

Through the above description of implementation modes, those skilled in the art may clearly know that the method according to the above embodiments may be implemented by means of software plus a necessary common hardware platform, certainly by means of hardware; but in many cases, the former is the better implementation. Based on this understanding, the technical solution of the present disclosure substantially or the part making a contribution to the prior art can be embodied in the form of software product; the computer software product is stored in a storage medium (for example, a Read-Only Memory (ROM)/Random Access Memory (RAM), a magnetic disk, and a compact disc) and includes a number of instructions to make a terminal device (which can be a cell phone, a personal computer, a server or a network device, etc.) perform all or part of the method in each embodiment of the present disclosure.

The present embodiment also provides a data access device, which is configured to implement the above embodiments and preferred implementations. The embodiments which have been elaborated will not be repeated here. The term "module" used below can realize a combination of software and/or hardware with an intended function. Although the device described in the following embodiment is realized through software better, the realization through hardware or a combination of software and hardware is possible and conceived.

Figure 9:
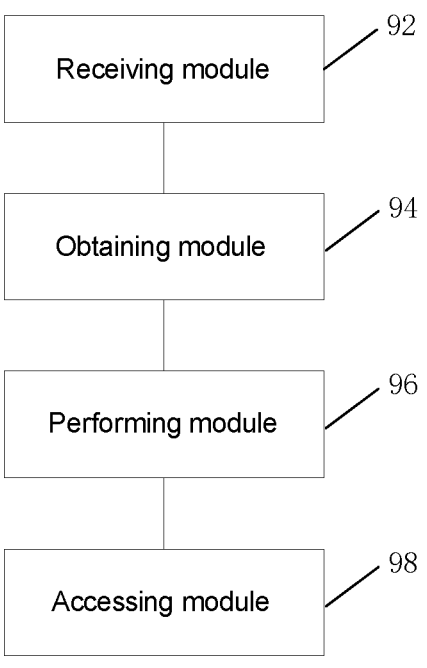
FIG. 9 is a structural block diagram of a data access device according to an embodiment of the present disclosure.

FIG. 9 is a structural block diagram of a data access device according to an embodiment of the present disclosure. As shown in FIG. 9, the device may include: a receiving module 92, an obtaining module 94, a performing module 96, and an accessing module 98.

The receiving module 92 is configured to receive the first access request used for requesting access to the data in the database.

The obtaining module 94 is configured to parse the first access request to obtain the following data corresponding to the first access request: the first access parameter, the first request type, and the first controlled field list.

The performing module 96 is configured to perform the first data protection operation on the first controlled field list based on the first access parameter and the first request type to obtain the target result.

The accessing module 98 is configured to synthesize the second access request based on the target result, and access the data in the database based on the second access request to obtain the access result.

The data access device corresponds to the database engine shown in FIG. 6, the receiving module 92 corresponds to the receiving module shown in FIG. 6, the performing module 96 corresponds to the data protection module shown in FIG. 6, and the accessing module 98 corresponds to the above execution engine. Specifically, the obtaining module 94 corresponds to the classification and grading unit in the policy module, and the accessing module 98 corresponds to the policy storage unit and the policy management unit in the policy module.

In an exemplary embodiment, the obtaining module 94 may parse the access request to obtain the first controlled field list corresponding to the first access request in the following way: in the case that the first access request is a request of DQL type, the top-level output field list of the request of DQL type is determined as the first controlled field list; in the case that the first access request is a request other than the request of DQL type, the target field list operated by the other request is determined, and the target field list is determined as the first controlled field list.

In an exemplary embodiment, the performing module 96 may perform the first data protection operation on the first controlled field list based on the first access parameter and the first request type to obtain the target result in the following way: the controlled field is selected from the first controlled field list in the preset order as a first controlled field; the first field protection rule, data security classification and data security level corresponding to the first controlled field are determined, different field protection rules corresponding to different combinations of trust condition, request type and processing action, and the trust conditions including the access permission condition corresponding to the first access parameter; and the first data protection operation is performed on the first controlled field based on the corresponding first processing action in the first field protection rule to obtain the target result.

In an exemplary embodiment, the performing module 96 may perform the first data protection operation on the first controlled field based on the corresponding first processing action in the first field protection rule to obtain the target result in the following way: a set of trust conditions corresponding to the first field protection rule are executed based on the first access parameters obtained, the first access parameters including at least one of the following: original request statement, user ID, user access level, access time, and network parameter; the first action type and the first action factor included in the first processing action are determined according to a set of trust condition execution results, the first action type being used for indicating the specific protection operation, and the first action factor being used for indicating the operator name of the specific protection operation and the actual parameter to be processed; and the first controlled field is protected based on the first action factor to obtain the target result.

In an exemplary embodiment, the performing module 96 may protect the first controlled field based on the first action factor to obtain the target result in the following way: in the case that the first processing action types include one of the desensitization action, the encryption action, the decryption action, the anonymization action and the customized action, the first controlled field is synthesized into a new SQL statement field based on the first action factor to obtain the target result.

In an exemplary embodiment, the device may be configured to configure the field protection rule based on the first configuration instruction received. The field protection rule includes a combination of request type, a set of trust conditions, and processing action. The request types include at least one of the following: the DQL type and the DML type. The trust conditions are used for defining the basic judgment unit of trusted access, at least including the trusted access types, the trusted access parameter names, the judgment operators and the parameter values. The trusted access types include at least one of the following: the ID trust condition, the level trust condition, the network trust condition, and the time trust condition. The judgment operators include greater than, greater than or equal to, less than or equal to, less than, equal to, not equal to. The processing action includes the action type and the action factor. The action type is used for indicating the specific protection operation, and the action factor is used for indicating the operator name of the specific protection operation and the actual parameter to be processed. The action types include at least one of the following: denying access, permitting access, displaying the raw data, desensitization processing, encryption processing, decryption processing, anonymization processing, audit processing, and alarm processing.

In an exemplary embodiment, in the case that the first access parameters include the user access level, the trust conditions include the level trust condition corresponding to the user access level. The level trust condition is used for determining that the user access level satisfies the level trust condition when it is determined that the user access level is greater than or equal to the data security level.

In an exemplary embodiment, the device may be further configured to configure the data security classification and data security level corresponding to each controlled field based on the second configuration instruction received. Multiple controlled fields under the same data security classification correspond to the same data security level.

It is to be noted that, each of the above modules may be realized by software or hardware. For the latter, the each of the above modules may be realized by, but not limited to, the following way: all of the above modules are in the same processor; or, the above modules are respectively in different processors in form of any combination.

The embodiments of the present disclosure also provide a computer-readable storage medium, in which a computer program is stored. The computer program is configured to perform, when running, the steps in any of the above method embodiments.

In an exemplary embodiment, the computer-readable storage media may include, but are not limited to, a USB flash disk, a Read-Only Memory (ROM), a Random Access Memory (RAM), a mobile hard disk, a magnetic disk, a compact disc, and other media capable of storing the computer program.

An embodiment of the present disclosure also provides an electronic device, which may include a memory and a processor. The memory stores a computer program. The processor is configured to run the computer program to execute the steps in any above method embodiment.

In an exemplary embodiment, the electronic device may also include a transmission device and an input/output device. The transmission device is connected with the processor, and the input/output device is connected with the processor.

The specific examples in the present embodiment may refer to the examples described in the above embodiments and exemplary implementation modes, and will not be repeated here.

It is apparent that those skilled in the art should appreciate that the above modules and steps of the present disclosure may be implemented by a general-purpose computing device, and they may be centralized in a single computing device or distributed on a network composed of multiple computing devices; they may be implemented by a program code which is capable of being executed by the computing device, so that they may be stored in a storage device and executed by the computing device; and in some situations, the presented or described steps may be executed in an order different from that described here; or they are made into integrated circuit modules, respectively; or multiple modules and steps of them are made into a single integrated circuit module to realize. Therefore, the present disclosure is not limited to any particular combination of hardware and software.

The above is only the preferred embodiments of the present disclosure and not intended to limit the present disclosure; for those skilled in the art, the present disclosure may have various modifications and changes. Any modifications, equivalent replacements, improvements and the like within the principle of the present disclosure should fall within the protection scope of the claims of the present disclosure.

What is claimed is:

1. A data access method, comprising:

receiving a first access request used for requesting access to data in a database;

parsing the first access request to obtain the following data corresponding to the first access request: a first access parameter, a first request type, and a first controlled field list;

performing a first data protection operation on the first controlled field list based on the first access parameter and the first request type to obtain a target result; and synthesizing a second access request based on the target result, and accessing the data in the database based on the second access request to obtain an access result;

wherein performing the first data protection operation on the first controlled field list based on the first access parameter and the first request type to obtain the target result comprises:

selecting a controlled field from the first controlled field list in a preset order as a first controlled field;

determining a first field protection rule, data security classification and data security level corresponding to the first controlled field, wherein different field protection rules correspond to different combinations of trust condition, request type and processing action, and the different combinations of trust condition comprise an access permission condition corresponding to the first access parameter; and performing the first data protection operation on the first controlled field based on the corresponding processing action in the first field protection rule to obtain the target result.

2. The method according to claim 1, wherein parsing the first access request to obtain the first controlled field list corresponding to the first access request comprises:

in a case that the first access request is a request of Data Query Language (DQL) type, determining a top-level output field list of the request of DQL type as the first controlled field list; and in a case that the first access request is a request other than the request of DQL type, determining a target field list operated by the other request, and determining the target field list as the first controlled field list.

3. The method according to claim 1, wherein performing the first data protection operation on the first controlled field based on the corresponding the processing action in the first field protection rule to obtain the target result comprises:

executing a set of trust conditions corresponding to the first field protection rule based on the first access parameter obtained, wherein the first access parameter comprise at least one of the following: original request statement, user ID, user access level, access time, and network parameter;

determining a first action type and a first action factor comprised in the processing action according to a set of trust conditions execution results, wherein the first action type is used for indicating a specific protection operation, and the first action factor is used for indicating an operator name of the specific protection operation and an actual parameter to be processed; and performing a protection processing on the first controlled field based on the first action factor to obtain the target result.

4. The method according to claim 3, wherein protecting the first controlled field based on the first action factor to obtain the target result comprises:

in a case that the processing action type comprise one of desensitization action, encryption action, decryption action, anonymization action and customized action, synthesizing the first controlled field into a new Structured Query Language (SQL) statement field based on the first action factor to obtain the target result.

5. The method according to claim 1, further comprising:

configuring the first field protection rule based on a first configuration instruction received, wherein the first field protection rule comprises a combination of the request type, a set of trust conditions, and the processing action;

the request type comprise at least one of the following: DQL type and Data Manipulation Language (DML) type;

the different combinations of trust condition are used for defining a basic judgment unit of trusted access, at least comprising trusted access types, trusted access parameter names, judgment operators and parameter values;

the trusted access types comprise at least one of the following: ID trust condition, level trust condition, network trust condition, and time trust condition;

the judgment operators comprise greater than, greater than or equal to, less than or equal to, less than, equal to, not equal to;

the processing action comprises an action type and an action factor; the action type is used for indicating a specific protection operation, and the action factor is used for indicating the operator name of the specific protection operation and an actual parameter to be processed;

the action type comprise at least one of the following: denying access, permitting access, displaying raw data, desensitization processing, encryption processing, decryption processing, anonymization processing, audit processing, and alarm processing.

6. The method according to claim 5, wherein in a case that the first access parameter comprise a user access level, the different combinations of trust condition comprise the level trust condition corresponding to the user access level; wherein the level trust condition is used for determining that the user access level satisfies the level trust condition when it is determined that the user access level is greater than or equal to the data security level.

7. The method according to claim 6, further comprising:

configuring the data security classification and data security level corresponding to each controlled field based on a second configuration instruction received, wherein multiple controlled fields under the same data security classification correspond to the same data security level.

8. A non-transitory computer readable storage medium, in which a computer program is stored, wherein the computer program is configured to execute, when running, the method according to claim 1.

9. An electronic device, comprising a memory and a processor, wherein the memory stores a computer program, and the processor is configured to run the computer program, so as to perform the method according to claim 1.

10. An electronic device, comprising a memory and a processor, wherein the memory stores a computer program, and the processor is configured to run the computer program, so as to perform the method according to claim 2.

11. An electronic device, comprising a memory and a processor, wherein the memory stores a computer program, and the processor is configured to run the computer program, so as to perform the method according to claim 3.

12. An electronic device, comprising a memory and a processor, wherein the memory stores a computer program, and the processor is configured to run the computer program, so as to perform the method according to claim 4.

13. An electronic device, comprising a memory and a processor, wherein the memory stores a computer program, and the processor is configured to run the computer program, so as to perform the method according to claim 5.

14. An electronic device, comprising a memory and a processor, wherein the memory stores a computer program, and the processor is configured to run the computer program, so as to perform the method according to claim 6.

15. An electronic device, comprising a memory and a processor, wherein the memory stores a computer program, and the processor is configured to run the computer program, so as to perform the method according to claim 7.

16. A non-transitory computer readable storage medium, in which a computer program is stored, wherein the computer program is configured to execute, when running, the method according to claim 2.

* * * * *